Feb. 12, 1963

J. A. FRAYLICK ET AL 3,077,251

MOLDING STRIP INSTALLATION

Filed June 29, 1960

INVENTORS
James A. Fraylick,
BY George Machek &
Benjamin S. Stawinski

E. W. Christen
ATTORNEY

Feb. 12, 1963 J. A. FRAYLICK ET AL 3,077,251
MOLDING STRIP INSTALLATION
Filed June 29, 1960 2 Sheets-Sheet 2

INVENTORS
James A. Fraylick,
George Machek &
BY Benjamin S. Stawinski
E. W. Christen
ATTORNEY 3,077,251
MOLDING STRIP INSTALLATION
James A. Fraylick, Warren, George Machek, Birmingham, and Benjamin S. Stawinski, Southfield, Mich., assignors to General Motors Corporation, Detroit, Mich., a corporation of Delaware
Filed June 29, 1960, Ser. No. 39,682
6 Claims. (Cl. 189—88)

This invention relates to molding installations and, more particularly, to an improved means for securing such molding strips on supporting panels.

In motor vehicle design and manufacture, it is quite common to use molding strips of substantially C-shaped cross section at various positions for esthetic appeal and to cover up objectionable appearing seams and joints. A problem usually exists, when making such installations, in finding a suitable fastening device for securing the strip to the supporting panel. It is desirable to have a fastening device which is applicable to molding strips with varying cross-sectional configurations and sizes and, further, to provide a positive retention to prevent the molding strips from loosening or falling from the supporting panel during the life of the vehicle. A further problem is often found in the sealing of the fastening device in the supporting panel. Water generally collects around the molding strips and if the aperture in the supporting panel is not properly sealed, rust is permitted to form, thus destroying the fastening and causing damage to the painted surface of the panel.

The device in which this invention is embodied comprises, generally, a molding strip fastening installation utilizing a resilient socket member which is received in the supporting panel, and a serrated stud extending from a plate device which is received in the molding strip to provide a positive retention means for the molding.

The fastening device is adaptable to a wide variety of shapes and sizes of molding strips and is relatively simple to manufacture and assemble. The locking of the molding strip to the supporting panel is positive, thus greatly decreasing the possibility of the molding strip becoming loose at some later time. The socket member is so constructed as to permit a small amount of axial alignment where the fastening device is not precisely placed in the molding strip prior to insertion in the supporting panel. Further the socket member is so constructed as to seal the aperture in the supporting panel to prevent the entry of water and prevent the formation of rust and corrosion.

These and other advantages will become more apparent from the following description and drawings.

Figure 1:
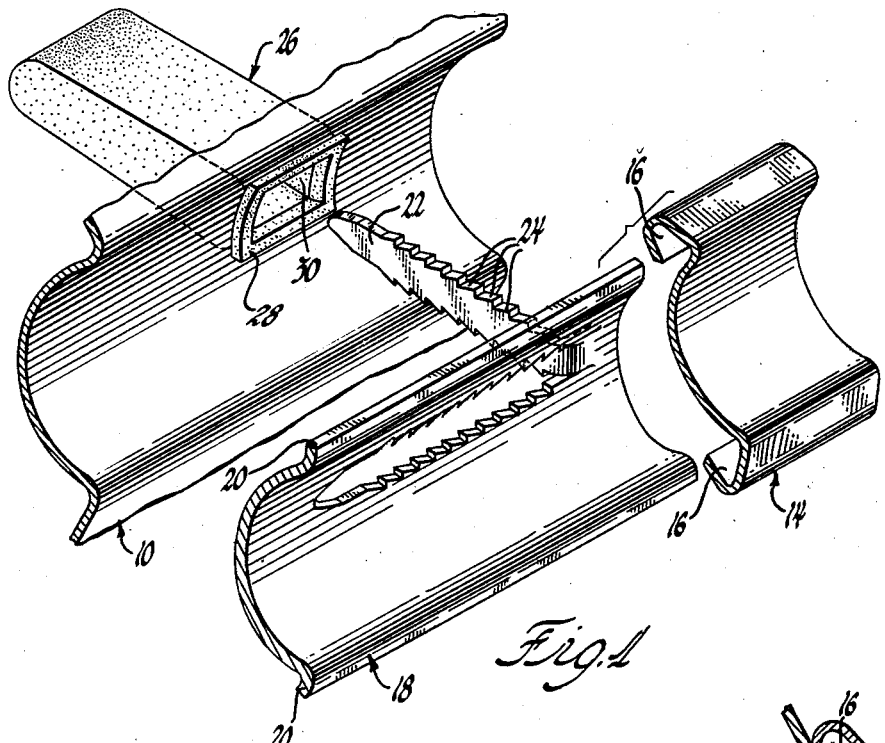
FIGURE 1 is an exploded perspective view of the molding strip installation illustrating the position of the various parts.

Referring more particularly to the drawings, FIGURES 1 through 4 illustrate one modification of a fastener device for securing a molding strip to a supporting panel. A supporting panel, illustrated generally by the numeral 10, is provided with an aperture 12 of circular, rectangular, or any other configuration. A molding strip, illustrated generally by the numeral 14, is to be secured to the supporting panel 10 and is provided with an inturned flange 16 along each edge thereof.

Figure 2:
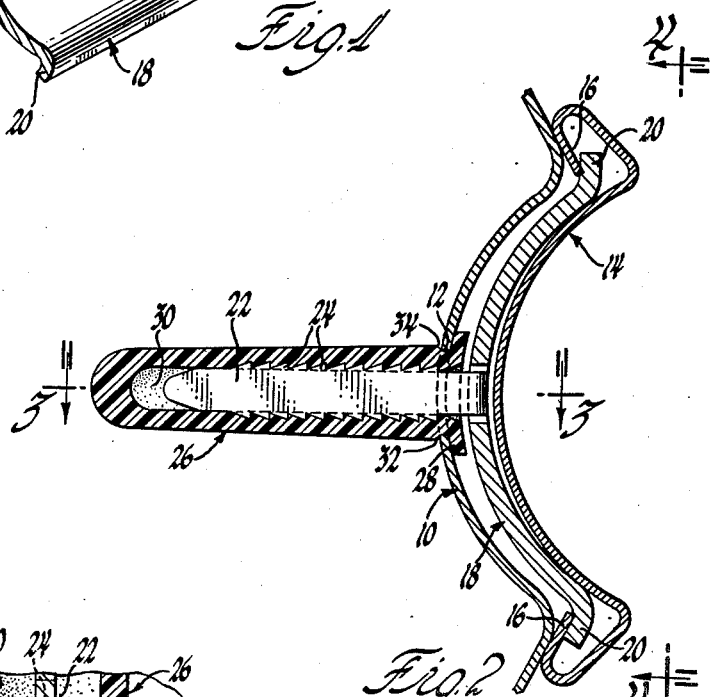
FIGURE 2 is a cross-sectional view of the molding strip installation with the parts in their assembled position.
Figure 3:
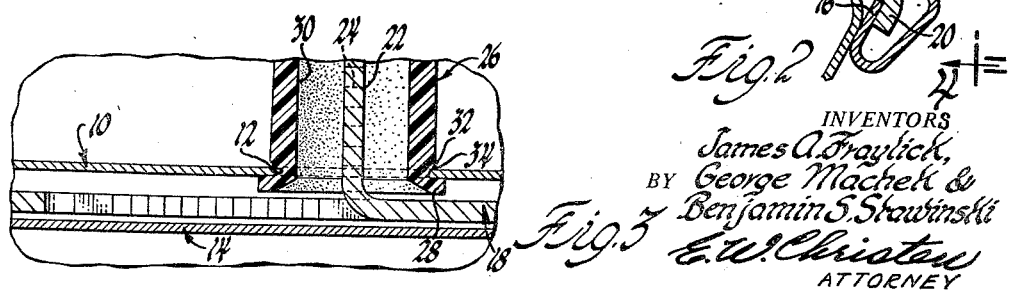
FIGURE 3 is a cross-sectional view of a portion of the molding strip installation illustrated in FIGURE 2, taken substantially along the line 3—3 of FIGURE 2 and looking in the direction of the arrows.
Figure 4:
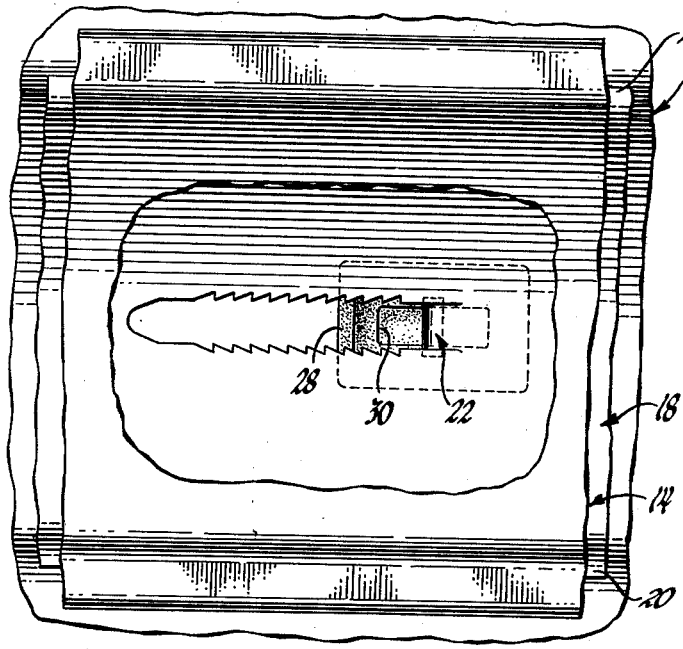
FIGURE 4 is an elevational view of the molding strip installation illustrated in FIGURE 2, taken substantially along the line 4—4 of FIGURE 2 and looking in the direction of the arrows.

The fastening device for securing the molding strip 14 to the panel 10 includes a plate, illustrated generally by the numeral 18, which is received in the molding strip 14 and extends transversely across the molding strip. As illustrated in FIGURE 2, the outer edges 20 of the plate 18 engage the inner surfaces of the inturned flanges 16 such that when the plate 18 is moved to the left, as viewed in FIGURE 2, the molding strip 14 will be clamped against the supporting panel 10.

In the modification shown in FIGURES 1 through 4, a stud, illustrated generally by the numeral 22, is punched out of the plate 18. Stud 22 is provided with a plurality of serrations 24 along opposite edges thereof, the serrations being provided by the punch which forms the stud out of the plate 18. The stud extends at substantially right angles from the plate member 18 and away from the molding strip 14.

A socket member, illustrated generally by the numeral 26, is disposed in the aperture 12 formed in the supporting panel 10. Socket member 26 may be formed of any suitable material, such as plastic, which permits a slight degree of resiliency and is strong enough to provide positive retention, as will hereinafter be described. The socket member 26 may be of rectangular or circular cross section to correspond to the shape of the aperture 12 in the supporting panel. Socket member 26 is provided with an enlarged head 28 which has greater dimensions than the aperture 12 in the supporting panel 10. This prevents the socket member 26 from being pushed completely through the aperture in the supporting panel.

The socket member 26 is provided with a central axial bore 30 which extends partially along the length thereof. The serrated stud 22 is received in this bore, the bore being of a smaller width than the width of the serrations 24 on the stud 22. It is seen that as the stud 22 is forced into the bore 30, the serrations permit easy movement in a direction to the left, as viewed in FIGURE 2, but will positively prevent movement out of the socket member 26 without damaging the socket member.

Socket member 26 is provided with a slightly enlarged portion, as indicated at 32, which takes the form of a peripheral barb closely adjacent the underside of the head 28. The width of the enlargement 32 is slightly greater than the width of the aperture 12 in the supporting panel 10, such that when the socket member is forced through the aperture 12, the enlarged portion 32 will contract to permit passage through the aperture and expand when once past the inner corners of the aperture 12. It may be seen in viewing FIGURES 2 and 3 than an inclined surface 34 is provided which engages the inner corners of the aperture 12 to positively retain the socket member in the panel and to seal the aperture against the water that might collect in that vicinity. It is further to be noted that the head 28 closely engages the outer surface of the panel 10 about the aperture 12 and is held in its proper position thereon by the inclined surface 34.

Figure 5:
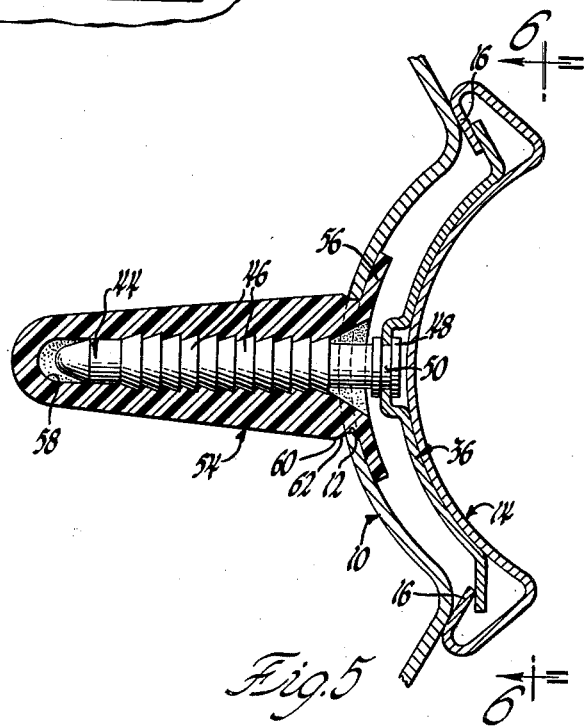
FIGURE 5 is a cross-sectional view of a molding strip installation utilizing a modification of the fastener assembly illustrated in FIGURES 1 through 4.
Figure 6:
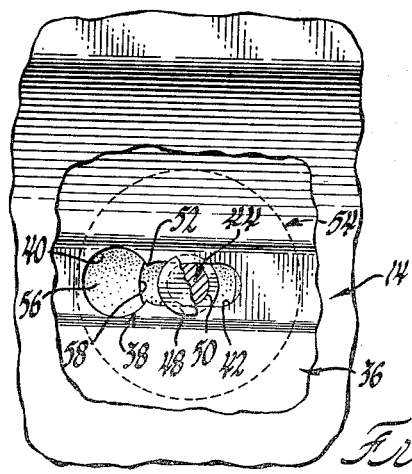
FIGURE 6 is an elevational view of the molding strip assembly of FIGURE 5 taken substantially along the line 6—6 in FIGURE 5 and looking in the direction of the arrows.

A modification of the above-described device is illustrated in FIGURES 5 and 6. The supporting panel 10 is provided with a suitable aperture 12 which may be circular, rectangular or any other desired configuration. Molding strip 14, having inturned flanges 16, is to be secured to the supporting panel 10 by means of the fastening device. A plate member 36 is provided with a keyhole slot 38, as best illustrated in FIGURE 6. Keyhole slot 38 includes a circular opening 40 connected to a longitudinal slot 42.

A serrated stud, illustrated generally by the numeral 44, having a plurality of annular barbs or serrations 46 formed along the length thereof, is secured in the keyhole slot 38 in the plate member 36. The stud 44 has an enlarged head 48 with an annular groove 50 formed between the opposite faces of the head 48. Head 48 is of such a diameter as to be received within the circular portion 40 of the keyhole slot 38 and the annular groove 50 provides a section of decreased diameter which is received in the slot 42 of the keyhole opening 38. It may be seen that in this position the enlarged head 48 prevents removal of the stud from the plate 36 without first sliding the head 48 into registry with the circular portion 40 of the keyhole slot 38. The stud 44 may be positively secured in the plate member by staking, as illustrated at 52 in FIGURE 6, to decrease the size of the slot 42 and prevent sliding the head 48 into the circular portion 40.

A socket member 54, having an enlarged head 56, is placed in the aperture 12 in the supporting panel 10 and a central bore 58 receives the serrated stud 44 such that the annular barbs 46 lock the stud in position in the socket member 54. An annular enlarged portion 60 and inclined surface 62 are provided to positively lock the socket member 54 in the aperture 12 in the supporting panel 10. This is similar to the socket member and its retention means illustrated in FIGURES 1–4 and indicated at 32—34.

It is also to be understood that the specific configuration of the plate member 18 in FIGURE 1, or 36 in FIGURE 2, may be of any suitable shape depending on the cross-sectional configuration and size of the molding strip. It is contemplated that the plate member may extend substantially along the length of the molding strip and have a plurality of serrated studs 22—44 extending therefrom and at spaced intervals therealong. Suitable apertures would be provided in the supporting panel and at substantially the same spacing as the studs extening from the strip.

The installation of the molding strip assembly may be as follows: The plate member 18 is slid or otherwise inserted into the molding strip 14 and engaging the flanges 16. The socket member is pushed into the aperture in the supporting panel such that the annular enlarged portion 32 first contracts and then expands on the opposite side of the supporting panel to retain itself in position in the panel. The molding strip and serrated stud are then forced into the central bore in the socket member to a sufficient degree to provide positive retention of the molding strip 14 on the supporting panel 10. It is easily seen that it is not necessary to push the serrated stud entirely into the socket member, it being only necessary to utilize as many of the serrations as are required for the proper strength.

Thus, it may be seen that a molding strip installation is provided which is positive in its retention means, eliminating the possibility of the molding strip becoming loose or falling off during normal operation of the vehicle. It is further seen that a fastening device is provided which seals the apertures formed in the supporting panel to prevent the formation of rust and corrosion due to water collecting about the molding strip or the aperture in the panel.

What is claimed is:

1. A molding strip fastener assembly for securing a molding strip to a supporting panel having an aperture formed therein, said molding strip having inturned flanges along opposite edges thereof, and said fastener assembly comprising a resilient socket member received in the aperture in said panel, said socket member having a head portion larger than the aperture and disposed on the same side of said panel as said molding strip, said socket member having an axial bore formed partially therethrough and through said head, a plate member disposed within said molding strip and engaging the inner sides of said inturned flanges, and a stud extending from said plate member and into said bore in said socket member, said stud having a plurality of barbs extending therefrom, said barbs and said stud being greater in width than said bore and expanding said socket member to a greater dimension than said aperture on the opposite side of said panel from said head to prevent said socket member from passing through said aperture, and said barbs biting into said socket member to prevent said stud from disengagement from said socket member and to retain said plate member and said molding strip against said supporting panel.

2. The molding strip fastener assembly set forth in claim 1 wherein said stud is formed integrally from said plate member.

3. The molding strip fastener assembly set forth in claim 1 wherein said plate member is provided with a keyhole slot and said stud is provided with a head having an annular groove formed therein, said head being receivable in the larger portion of said keyhole slot and slidable into the narrower portion of said keyhole slot such that said head on opposite sides of said annular groove retains said head in said plate.

4. The molding strip fastener assembly set forth in claim 1 wherein said plate member extends substantially the length of said molding strip and has a plurality of studs extending therefrom.

5. A two piece fastener assembly for securing a molding strip to a supporting panel, said molding strip having a pair of inturned flanges formed along the edges thereof and said panel having an aperture formed therein, said fastener assembly comprising a resilient socket member adapted to be received in said aperture in said panel and having an axial bore formed therein, a head integrally formed on said socket member and larger in size than said aperture, and a plate member adapted to be received in said molding strip and engage the inner surface of said inturned flanges, a stud formed from said plate member and extending at substantially 90° therefrom, said stud having a plurality of barbs extending outwardly thereof and along the length of said stud, said barbs being of slightly greater dimension than the width of said bore in said socket member to expand said socket member on insertion therein for locking said socket member in said panel, and said barbs being adapted to bite into said socket member and prevent removal therefrom.

6. A three piece fastener assembly for securing a molding strip to a supporting panel, said molding strip having a pair of inturned flanges formed along the edges thereof and said panel having an aperture formed therein, said fastener assembly comprising a resilient socket member adapted to be received in said aperture in said panel and having an axial bore formed therein, said socket member having an integral head formed thereon and larger in size than said aperture in said panel, a plate member adapted to be received in said molding strip and to engage the inner surface of said inturned flanges, said plate member having a circular hole formed therein and an elongated slot formed therein, said hole and said slot being interconnected, and a stud extending from said plate member, said stud having an enlarged head with an annular groove formed therein, said head being smaller than said circular hole and larger than said elongated slot and receivable in said circular hole and slidable in said elongated slot to secure said stud in said plate, and said stud having a plurality of annular barbs disposed along the length thereof and larger in diameter than said bore in said socket member to expand said socket member on insertion therein for locking said socket member and said plate and said molding strip on said panel.

References Cited in the file of this patent

UNITED STATES PATENTS 2,196,417    Kelsen  _____ Apr. 9, 1940
2,900,687    Cochran  _____ Aug. 25, 1959